United States Patent
Daniali (10) Patent No.: US 11,305,195 B2
(45) Date of Patent: Apr. 19, 2022

(54) EXTENDED ENVIRONMENTAL USING REAL-WORLD ENVIRONMENT DATA

(71) Applicant: T-Mobile USA, Inc., Bellevue, WA (US)

(72) Inventor: Ali Daniali, Lynnwood, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 71 days.

(21) Appl. No.: 16/870,321

(22) Filed: May 8, 2020

(65) Prior Publication Data
US 2021/0346805 A1 Nov. 11, 2021

(51) Int. Cl.
| | |
|---|---|
| A63F 13/65 | (2014.01) |
| G06T 19/00 | (2011.01) |
| A63F 13/23 | (2014.01) |
| A63F 13/803 | (2014.01) |
| B60R 16/023 | (2006.01) |
| G09B 9/05 | (2006.01) |

(52) U.S. Cl.
CPC .............. *A63F 13/65* (2014.09); *A63F 13/23* (2014.09); *A63F 13/803* (2014.09); *B60R 16/023* (2013.01); *G06T 19/006* (2013.01); *A63F 2300/1025* (2013.01); *A63F 2300/69* (2013.01); *A63F 2300/8017* (2013.01); *A63F 2300/8082* (2013.01); *G09B 9/05* (2013.01)

(58) Field of Classification Search
CPC ........ A63F 13/65; A63F 13/23; A63F 13/803; A63F 2300/1025; A63F 2300/69; A63F 2300/8017; A63F 2300/8082; B60R 16/023; G06T 19/006; G09B 9/05
See application file for complete search history.

(56) References Cited

U.S. PATENT DOCUMENTS

| | | | | |
|---|---|---|---|---|
| 4,305,131 A | * | 12/1981 | Best .................... | A63F 13/00 715/716 |
| 4,569,529 A | * | 2/1986 | Gibbs .................. | A63F 9/00 273/274 |
| 4,781,377 A | * | 11/1988 | McVean ............. | A63F 3/00082 119/702 |
| 5,476,259 A | * | 12/1995 | Weingardt ........... | A63F 3/081 463/25 |
| 5,490,247 A | * | 2/1996 | Tung .................. | H04L 12/1813 345/501 |
| 5,508,731 A | * | 4/1996 | Kohorn ................ | A63F 13/12 725/24 |

(Continued)

*Primary Examiner* — David L Lewis
*Assistant Examiner* — Matthew D Hoel
(74) *Attorney, Agent, or Firm* — Han Santos, PLLC (57) ABSTRACT

Techniques are described herein for presenting an extended environment based on real data obtained from a real-world environment. The techniques include pairing an XR capable user device and an onboard diagnostics (OBD) accessory device. Upon pairing, the XR capable user device receives vehicle data of a vehicle equipped with the OBD accessory device in a real-world environment. Based at least on the vehicle data, a virtual location and a virtual position of a user in an extended environment are determined, wherein the user operates the XR capable user device in the real-world environment represented in the extended environment. Upon determining the virtual location and the virtual position, the extended environment is presented via the XR capable user device.

16 Claims, 5 Drawing Sheets

(56) References Cited

U.S. PATENT DOCUMENTS

| | | | | |
|---|---|---|---|---|
| 5,539,822 A * | 7/1996 | Lett | H04N 21/44222 | 380/211 |
| 5,553,864 A * | 9/1996 | Sitrick | B05B 15/16 | 463/31 |
| 5,595,389 A * | 1/1997 | Parulski | A63F 13/10 | 463/31 |
| 5,860,862 A * | 1/1999 | Junkin | G06Q 10/107 | 463/40 |
| 6,325,721 B1 * | 12/2001 | Miyamoto | G06Q 50/34 | 463/40 |
| 6,508,709 B1 * | 1/2003 | Karmarkar | G07F 17/32 | 463/40 |
| 6,544,121 B2 * | 4/2003 | DeWeese | G06Q 50/34 | 348/460 |
| 6,612,925 B1 * | 9/2003 | Forsberg | A63F 13/10 | 463/6 |
| 6,674,448 B1 * | 1/2004 | Garahi | H04N 5/44543 | 715/719 |
| 6,695,701 B2 * | 2/2004 | Aronson | G07F 17/32 | 463/25 |
| 6,712,701 B1 * | 3/2004 | Boylan, III | G06Q 50/34 | 463/42 |
| 6,726,567 B1 * | 4/2004 | Khosla | A63F 13/10 | 463/42 |
| 6,733,383 B2 * | 5/2004 | Busse | A63F 13/10 | 463/6 |
| 6,735,435 B2 * | 5/2004 | Newell | A63F 13/12 | 455/419 |
| 6,735,487 B1 * | 5/2004 | Marshall | G06Q 30/02 | 463/40 |
| 6,744,403 B2 * | 6/2004 | Milnes | G01S 5/0027 | 342/357.57 |
| 6,773,347 B1 * | 8/2004 | Marshall | G06Q 50/34 | 379/93.13 |
| 6,837,789 B2 * | 1/2005 | Garahi | G06Q 50/34 | 463/29 |
| 6,837,791 B1 * | 1/2005 | McNutt | G06Q 50/34 | 463/25 |
| 6,848,991 B2 * | 2/2005 | Kusuda | A63F 9/143 | 463/6 |
| 6,860,806 B2 * | 3/2005 | Kojima | G07F 17/3288 | 463/40 |
| 6,869,364 B2 * | 3/2005 | DeWeese | G07F 17/3288 | 348/460 |
| 6,887,156 B2 * | 5/2005 | DeWeese | G06Q 50/34 | 463/30 |
| 6,940,538 B2 * | 9/2005 | Rafey | H04N 5/222 | 348/157 |
| 6,990,681 B2 * | 1/2006 | Wang | H04N 5/222 | 348/143 |
| 6,991,544 B2 * | 1/2006 | Soltys | G07F 17/32 | 463/16 |
| 7,004,839 B2 * | 2/2006 | Suzuki | A63F 13/12 | 463/42 |
| 7,008,324 B1 * | 3/2006 | Johnson | G07F 17/32 | 345/156 |
| 7,090,577 B2 * | 8/2006 | Serizawa | A63F 13/10 | 463/6 |
| 7,162,532 B2 * | 1/2007 | Koehler | H04H 20/04 | 463/40 |
| 7,173,672 B2 * | 2/2007 | Gibbs | H04N 5/2224 | 345/632 |
| 7,201,658 B2 * | 4/2007 | Marshall | G06Q 50/34 | 379/93.13 |
| 7,211,000 B2 * | 5/2007 | Jutzi | A63F 13/12 | 463/40 |
| 7,229,354 B2 * | 6/2007 | McNutt | G06Q 20/3674 | 348/E7.071 |
| 7,243,363 B1 * | 7/2007 | Ohba | A63F 13/12 | 725/80 |
| 7,264,546 B2 * | 9/2007 | Marshall | G06Q 30/02 | 379/93.13 |
| 7,287,722 B2 * | 10/2007 | Diamandis | B64G 5/00 | 244/1 R |
| 7,305,691 B2 * | 12/2007 | Cristofalo | H04N 21/4415 | 725/34 |
| 7,339,609 B2 * | 3/2008 | Gibbs | H04N 21/2187 | 348/157 |
| 7,351,138 B2 * | 4/2008 | Busse | A63F 13/10 | 463/1 |
| 7,427,234 B2 * | 9/2008 | Soltys | G07F 17/3237 | 463/16 |
| 7,435,176 B2 * | 10/2008 | McNutt | G06Q 50/34 | 463/28 |
| 7,454,380 B2 * | 11/2008 | Garahi | G06Q 10/063 | 705/37 |
| 7,593,687 B2 * | 9/2009 | Anderson, Jr. | H04H 20/61 | 455/3.06 |
| 7,628,695 B2 * | 12/2009 | Lee | G07F 17/3288 | 463/25 |
| 7,648,414 B2 * | 1/2010 | McNutt | G06Q 30/02 | 463/25 |
| 7,651,394 B2 * | 1/2010 | Johnson | G07F 17/32 | 463/26 |
| 7,657,920 B2 * | 2/2010 | Arseneau | H04H 60/16 | 725/133 |
| 7,725,073 B2 * | 5/2010 | Anderson, Jr. | H04N 21/25841 | 455/3.06 |
| 7,731,586 B2 * | 6/2010 | Letovsky | G07F 17/32 | 463/20 |
| 7,753,756 B2 * | 7/2010 | McDermott | H04B 7/005 | 446/454 |
| 7,859,597 B2 * | 12/2010 | Anderson, Jr. | H04H 20/61 | 348/725 |
| 7,901,292 B1 * | 3/2011 | Uhlir | A63F 13/216 | 463/42 |
| 7,929,903 B2 * | 4/2011 | Anderson, Jr. | H04N 21/6137 | 455/3.06 |
| 7,930,716 B2 * | 4/2011 | Liga | H04N 21/4331 | 725/36 |
| 7,931,532 B2 * | 4/2011 | Johnson | G07F 17/32 | 463/27 |
| 7,934,684 B2 * | 5/2011 | Diamandis | B64G 9/00 | 244/171.4 |
| 7,934,983 B1 * | 5/2011 | Eisner | A63K 3/00 | 463/6 |
| 7,950,990 B2 * | 5/2011 | Marshall | G07F 17/32 | 463/6 |
| 7,966,636 B2 * | 6/2011 | Arseneau | H04N 21/2365 | 725/100 |
| 8,022,965 B2 * | 9/2011 | Gibbs | H04N 21/21805 | 345/619 |
| 8,025,562 B2 * | 9/2011 | Walker | G07F 17/32 | 463/20 |
| 8,025,566 B2 * | 9/2011 | Walker | G07F 17/323 | 463/25 |
| 8,029,362 B2 * | 10/2011 | Walker | G06Q 10/06375 | 463/30 |
| 8,042,140 B2 * | 10/2011 | Thomas | H04N 21/25875 | 725/94 |
| 8,051,452 B2 * | 11/2011 | Arseneau | G06F 3/0482 | 725/74 |
| 8,051,453 B2 * | 11/2011 | Arseneau | H04H 20/57 | 725/94 |
| 8,062,111 B2 * | 11/2011 | Aronson | G07F 17/3288 | 463/6 |
| 8,083,589 B1 * | 12/2011 | Kavars | A63F 13/211 | 463/36 |
| 8,123,618 B2 * | 2/2012 | Karmarkar | G07F 17/32 | 463/42 |
| 8,127,037 B2 * | 2/2012 | Koehler | H04L 12/1822 | 709/231 |
| 8,160,994 B2 * | 4/2012 | Ong | G06N 3/004 | 706/62 |
| 8,182,348 B2 * | 5/2012 | Uhlir | A63F 13/798 | 463/59 |
| RE43,601 E * | 8/2012 | Arseneau | H04N 21/4728 | 725/32 |

(56) References Cited

U.S. PATENT DOCUMENTS

| | | | | |
|---|---|---|---|---|
| 8,235,815 B1* | 8/2012 | Kavars | A63F 13/25 | 463/36 |
| 8,239,910 B2* | 8/2012 | Anderson, Jr. | H04N 21/2383 | 725/118 |
| 8,253,865 B2* | 8/2012 | Anderson, Jr. | H04H 20/61 | 348/725 |
| 8,333,643 B2* | 12/2012 | Eisner | G06F 17/40 | 463/6 |
| 8,357,045 B2* | 1/2013 | Youm | A63F 13/795 | 463/42 |
| 8,366,542 B2* | 2/2013 | White | G07F 17/32 | 463/25 |
| 8,382,584 B2* | 2/2013 | White | G07F 17/32 | 463/25 |
| 8,391,773 B2* | 3/2013 | Arseneau | H04N 21/4532 | 455/3.06 |
| 8,391,774 B2* | 3/2013 | Arseneau | H04N 21/4331 | 455/3.06 |
| 8,391,825 B2* | 3/2013 | Arseneau | G06F 3/0481 | 455/403 |
| 8,419,544 B2* | 4/2013 | McNutt | G07F 17/3223 | 463/42 |
| 8,430,755 B2* | 4/2013 | Youm | A63F 13/49 | 463/42 |
| 8,432,489 B2* | 4/2013 | Arseneau | H04H 20/63 | 348/461 |
| 8,444,490 B2* | 5/2013 | Youm | A63F 13/335 | 463/42 |
| 8,444,492 B2* | 5/2013 | Youm | A63F 13/48 | 463/42 |
| 8,454,428 B2* | 6/2013 | Pacey | G07F 17/3211 | 463/22 |
| 8,457,350 B2* | 6/2013 | Gibbs | G09G 5/377 | 382/100 |
| 8,496,531 B2* | 7/2013 | Youm | A63F 13/77 | 463/42 |
| 8,562,402 B2* | 10/2013 | Masuyama | A63F 13/92 | 463/7 |
| 8,585,476 B2* | 11/2013 | Mullen | A63F 13/00 | 463/1 |
| 8,585,505 B2* | 11/2013 | Youm | A63F 13/44 | 463/42 |
| 8,668,561 B2* | 3/2014 | Hansen | A63F 13/23 | 463/1 |
| 8,696,469 B2* | 4/2014 | Youm | A63F 13/10 | 463/42 |
| 8,701,147 B2* | 4/2014 | Thomas | H04N 21/25875 | 725/94 |
| 8,725,064 B2* | 5/2014 | Anderson, Jr. | H04N 7/181 | 455/3.06 |
| 8,732,781 B2* | 5/2014 | Anderson, Jr. | H04N 21/41415 | 725/118 |
| 8,897,903 B2* | 11/2014 | Eisner | A63K 3/00 | 700/91 |
| 8,932,136 B2* | 1/2015 | Lemmons | A63F 3/081 | 463/40 |
| 8,947,253 B2* | 2/2015 | Bloom | H04N 21/41422 | 340/691.1 |
| 8,977,585 B2* | 3/2015 | Cavallaro | G01S 5/16 | 706/46 |
| 8,992,298 B2* | 3/2015 | Walker | G06Q 10/063 | 463/20 |
| 8,992,299 B2* | 3/2015 | Walker | G06Q 10/063 | 463/20 |
| 9,039,410 B2* | 5/2015 | Walker | G07F 17/32 | 432/20 |
| 9,043,829 B2* | 5/2015 | Klein | H04N 21/8173 | 725/32 |
| 9,059,809 B2* | 6/2015 | Koehler | H04L 65/4038 | |
| 9,065,984 B2* | 6/2015 | Arseneau | H04N 21/234327 | |
| 9,210,473 B2* | 12/2015 | Belton | H04N 21/4104 | |
| 9,242,177 B2* | 1/2016 | Bistis | H04N 5/272 | |
| 9,248,378 B2* | 2/2016 | Pierucci | A63F 13/803 | |
| 9,300,924 B2* | 3/2016 | Anderson, Jr. | H04S 1/002 | |
| 9,350,776 B2* | 5/2016 | Koehler | H04L 65/608 | |
| 9,352,216 B2* | 5/2016 | Mullen | A63F 13/12 | |
| 9,364,751 B2* | 6/2016 | Avent | A63F 13/335 | |
| 9,374,548 B2* | 6/2016 | Anderson, Jr. | H04N 21/2383 | |
| 9,522,332 B2* | 12/2016 | Hansen | A63F 13/5375 | |
| 9,560,419 B2* | 1/2017 | Koehler | H04N 21/233 | |
| 9,571,903 B2* | 2/2017 | Cronin | G11B 27/102 | |
| 9,573,058 B2* | 2/2017 | Avent | A63F 13/335 | |
| 9,591,336 B2* | 3/2017 | Cronin | H04N 5/247 | |
| RE46,360 E * | 4/2017 | Anderson, Jr. | H04H 20/61 | |
| 9,643,081 B1* | 5/2017 | Kavars | A63F 13/212 | |
| 9,655,027 B1* | 5/2017 | Cronin | H04W 4/02 | |
| 9,674,491 B2* | 6/2017 | Anderson, Jr. | H04R 27/00 | |
| 9,699,523 B1* | 7/2017 | Cronin | G06F 16/743 | |
| 9,729,644 B1* | 8/2017 | Cronin | H04B 10/116 | |
| 9,744,448 B2* | 8/2017 | Mullen | A63F 13/00 | |
| 9,757,639 B2* | 9/2017 | Eisner | A63K 3/00 | |
| 9,760,572 B1* | 9/2017 | Cronin | G06F 16/71 | |
| 9,858,765 B2* | 1/2018 | Feier | A63F 13/825 | |
| 9,952,042 B2 | 4/2018 | Abovitz et al. | | |
| 10,046,231 B2* | 8/2018 | Masuyama | A63F 13/92 | |
| 10,092,812 B2* | 10/2018 | Eisner | A63B 71/0616 | |
| 10,179,277 B2* | 1/2019 | Mullen | A63F 13/216 | |
| 10,357,715 B2* | 7/2019 | Buxton | G06F 3/013 | |
| 10,467,847 B2* | 11/2019 | Khosla | G07F 17/326 | |
| 10,490,027 B2* | 11/2019 | Feier | A63F 13/25 | |
| 10,512,835 B1* | 12/2019 | Kavars | A63F 13/212 | |
| 10,789,804 B2* | 9/2020 | Khosla | G07F 17/3244 | |
| 10,828,559 B2* | 11/2020 | Mullen | A63F 13/26 | |
| 10,888,791 B2* | 1/2021 | Krosky | A63F 13/67 | |
| 10,953,330 B2* | 3/2021 | Buxton, II | G09B 9/04 | |
| 2008/0310707 A1 | 12/2008 | Kansal et al. | | |

\* cited by examiner

EXTENDED ENVIRONMENTAL USING REAL-WORLD ENVIRONMENT DATA

BACKGROUND

Cybersickness occurs when exposure to a virtual or augmented environment causes symptoms that are similar to manifestations of motion sickness such as dizziness and nausea. Cybersickness is caused by conflicting signals sent to the brain from the person's eyes, inner ear, and body tissue sensory receptors. The feeling of sickness is typically exacerbated when a user watching a digital representation of themselves appear to move more quickly or slowly in a virtual or augmented environment than the user's physical body.

To help reduce the sensory conflicts, frame per second (FPS) rate may be adjusted to reduce lag time. However, individual users may have different sensitivity to frame rates. Accordingly, adjusting the FPS rate does not reduce sensory conflicts for all users and may cause some users to continue to experience cybersickness. Another method to alleviate sensory conflicts is to reduce latency of projected scenes. However, reducing latency may require a reliable network connection, which may not be available. Thus, visual presentation and screen shifts may not occur in real-time, thereby mismatching what a user's eyes tell them and what their body's tissue sensors are experiencing.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

This disclosure is directed to techniques for presenting a virtual environment, an augmented environment, or a combination of both based on real data obtained from a real-world environment. For the sake of clarity, a pseudo-acronym "XR" or Extended Reality has been defined to represent a plurality of different modes that application users may experience virtual reality. For example, XR modes may include a Virtual Reality (VR) mode, an Augmented Reality (AR) mode, and a Mixed Reality (MR) mode. The VR mode describes an interactive computer-generated experience within a simulated environment. In other words, the VR mode represents fully computer-generated content that appears to surround the user and excludes the real-world environment. The VR mode may include multiple sensory modalities such as visual, auditory, haptic, olfactory, or any combination thereof. The AR mode describes an interactive experience that overlays computer-generated content within a real-world environment. More specifically, rather than replacing the real-world environment with a simulated adaptation, the AR mode constructively (i.e., additive to the real-world environment) or destructively (i.e., masking of the real-world environment) overlays virtual content onto physical objects that reside in the real world. In some examples, virtual content may include multiple sensory modalities such as visual, auditory, haptic, olfactory, or any combination thereof. In some examples, virtual content may include text or audio annotations that provide an application user with direction and/or instruction, as it relates to the marker. The MR mode describes a merging of real-world and simulated environments to produce a "mixed" environment whereby physical and virtual objects co-exist and interact in real-time. For example, the MR mode may alter virtual objects in response to manipulation of physical objects in a real-world environment.

In one aspect, the techniques include implementing a system that comprises an onboard diagnostics (OBD) accessories device for a vehicle that is communicatively coupled to an XR capable user device such as an AR/VR/MR head mounted device (HMD) or other handheld devices such as smartphones and mobile devices. The OBD accessory devices may include an interface for connecting to a vehicle's OBD connector port (e.g., OBD-II) to communicate with the vehicle's native OBD device. In this way, the OBD accessory device is configured to collect vehicle data such as the vehicle's position data, the vehicle's speed, and acceleration, traffic patterns, environmental data, and/or so forth. While example embodiments described herein include the OBD accessory devices, those ordinarily skilled in the art would understand that the present techniques contemplate a variety of devices (e.g., black boxes, voyage data recorder [VDR], Digital Flight Data Recorder [DFDR], event data recorders, etc.) that interface with vehicle systems.

The XR capable user device comprises an XR application installed thereon. Generally, the XR application is configured to present an extended environment or a three-dimensional (3D) computer-generated environment where a user may interact with virtual objects in real locations. In some aspects, the XR application is configured to receive vehicle data from the OBD accessory device to perform accurate location and positioning of a user in an extended environment while the user is operating the XR capable user device in the vehicle. The user may be a passenger of the vehicle and the vehicle may be operated by a driver. The XR capable user device may also be in communication with distributed computing resources such as edge servers, which include the XR application.

In one example, the XR application may extract location data from the vehicle data to determine a user's real-time virtual location in an extended environment representing a real-world environment, wherein the real-world location associated with the location data corresponds to the user's real-time virtual location. Accordingly, the XR application may place the user in the same location within the extended environment as the user is in the real-world environment.

Similarly, the XR application may extract speed data from the vehicle data to determine a user's virtual speed of movement in the extended environment, wherein the real-world speed of the vehicle associated with the speed data corresponds with the user's virtual speed of movement in the extended environment. In one example, a game user interface may provide an extended environment with one or more game components such as a race car. In this case, the user may be operating the race car in the extended environment, wherein the race car may travel at the same speed as the real vehicle. In another example, an educational user interface may provide an extended environment with one or more virtual objects such as landmark information. In this case, the user may view landmark information in the extended environment during a virtual tour as the real vehicle is driving along a route. In yet another example, a training user interface may provide an extended environment with one or more virtual objects representing driving instructions and safety messages. In this case, the user may be operating a virtual car in the extended environment to learn how to drive a real vehicle in a real-world environment.

Additionally, the XR application may extract travel direction from the vehicle data to determine a user's virtual position or orientation in the extended environment, wherein the vehicle serves as a frame of reference and the orientation of the user is relative to the vehicle. At the user's initial position in a real-world environment, the orientation of the user may correspond to the orientation of the vehicle such that the user and the vehicle are facing the same direction and the viewpoint of the vehicle and the XR capable user device are the same in the real-world environment and the extended environment.

Subsequently, a sensor (e.g., a motion sensor, gyroscope, accelerometer, etc.) attached to the XR capable user device may sense in a real-world environment body movement of the user operating the XR capable user device. For example, the sensor may determine an angle of rotation of the user, degrees of movement (e.g., 90 degrees relative to where the user used to be), a delta rotation, and/or so forth. In response, the XR application may, based on the new position of the user in the real-world environment with respect to the vehicle, adjust the orientation of the user in the extended environment and display of the extended environment accordingly. In this regard, the XR application may present the extended environment to the user in the same way that the user would see the real-world environment.

The techniques described herein may be implemented in a number of ways. Example implementations are provided below with reference to the following figures.

Example Network Architecture

Figure 1:
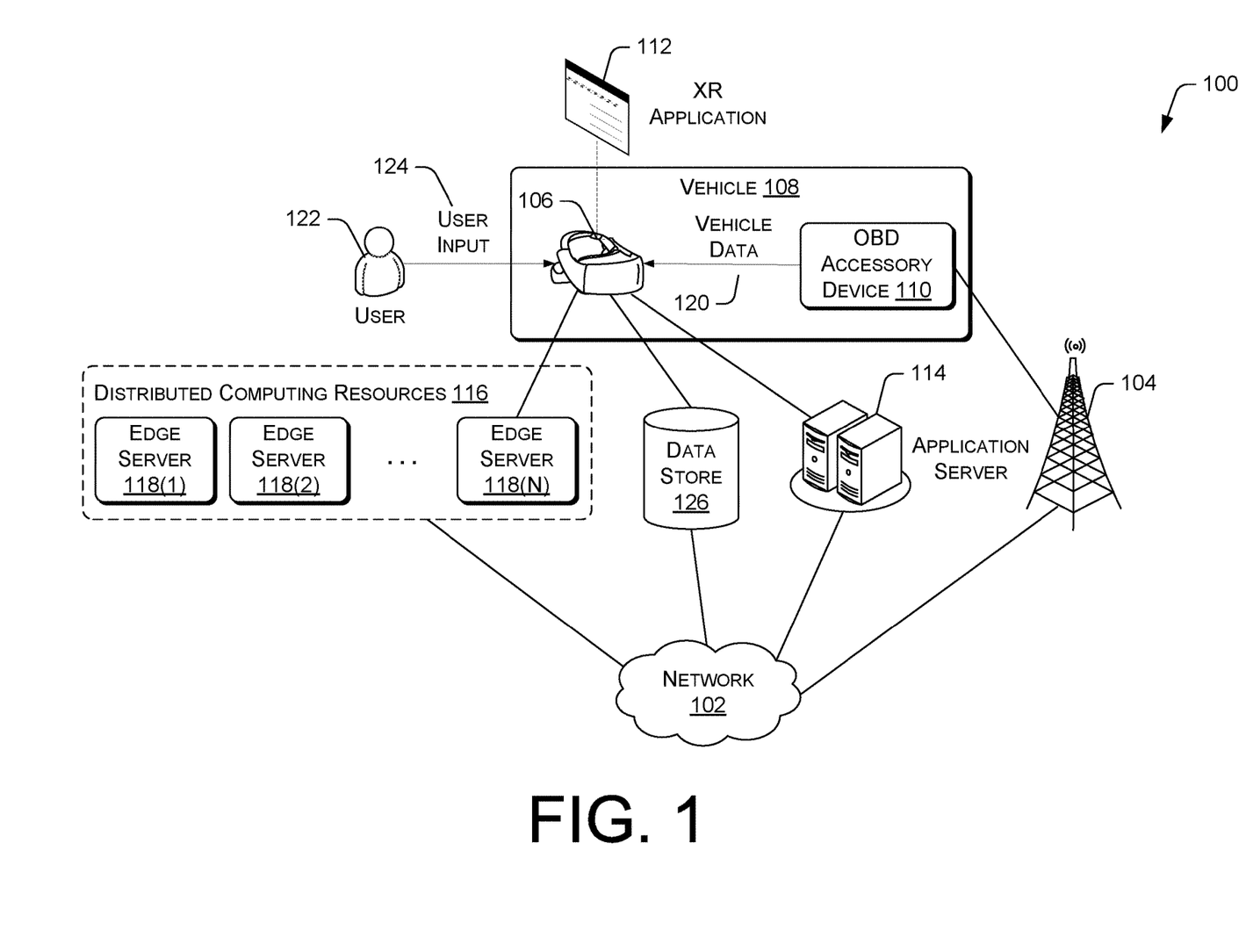
FIG. 1 illustrates an example network architecture for presenting an extended environment via an XR capable user device using real-world environment data.

FIG. 1 illustrates an example architecture 100 for presenting an extended environment via an XR capable user device using real-world environment data. The architecture 100 may include an XR capable user device 106 in communication with a network 102. The network 102 can be a cellular network that implements 2G, 3G, 4G, 5G, and long-term evolution (LTE), LTE advanced, high-speed data packet access (HSDPA), evolved high-speed packet access (HSPA+), universal mobile telecommunication system (UMTS), code-division multiple access (CDMA), global system for mobile communications (GSM), a local area network (LAN), a wide area network (WAN), and/or a collection of networks (e.g., the Internet).

The XR capable user device 106 may comprise a variety of handheld user devices such as a head mounted device (HMD), smartphones, mobile devices, wearable devices, and/or other electronic devices having a wireless communication function that are capable of receiving input, processing the input, and generating output data. The XR capable user device 106 may be operated by a user 122 (i.e., a passenger) traveling within a vehicle 108 operated by a driver, wherein the vehicle 108 is equipped with an OBD accessory device 110. While the vehicle 108 comprises an automobile in FIG. 1, vehicle 108 may also comprise boats, trains, airplanes, and/or other modes of transportation.

The OBD accessory device 110 is configured to collect vehicle data 120 of the vehicle 108 from the vehicle's native OBD device, which communicates with the vehicle's sensors. In some aspects, the OBD accessory device 110 may directly communicate with one or more sensors of the vehicle 108. The vehicle's sensors may include a speed sensor, Global Positioning System (GPS), Global Navigation Satellite system (GNSS), brake sensors, impact sensors, cameras, and/or so forth. In some embodiments, the vehicle 108 may comprise an autonomous vehicle and may comprise intelligent navigation and collision warning systems comprising an infrared (IR) sensor, Light Detection and Ranging (LiDAR), radar, ultrasonic sensor, and/or so forth. The OBD accessory device 110 may be paired to the XR capable user device 106.

The OBD accessory device 110 can include a plug-in component or another communication interface for physically connecting to the vehicle 108 (e.g., via OBD-II, diagnostics port, etc.). The OBD accessory device 110 may comprise various hardware and software components configured to scan, read, and/or collect vehicle data 120 from the vehicle's native OBD device. For example, the vehicle data 120 can include speed and acceleration data, location data, orientation data, travel direction, vehicle disturbance data, movement data, braking data, traffic data, environmental data, and/or so forth.

The OBD accessory device 110 may be a component of a connected vehicle platform and may communicate with a network entity. In one aspect, the OBD accessory device 110 may include a communication interface to transmit vehicle data 120 to over one or more of the air interfaces in a network 102. In the illustrated embodiment, the OBD accessory device 110 may transmit the vehicle data 120 to a base station 104 (e.g., eNode B). In turn, the base station 104 may pass the vehicle data 120 to other entities such as distributed computing resources 116 including edge servers 118(1)-118(N), data store 126, and/or so forth.

FIG. 1 further includes an XR application server 114 that is connected to the network 102. The XR application server 114 can be implemented as a plurality of structurally separate servers or may correspond to a single server. The XR application server 114 can include a vehicle location and positioning module for collecting vehicle data 120 from the OBD accessory device 110 and reporting vehicle data 120 to the XR capable user device 106.

The XR capable user device 106 may include a locally-installed XR application 112. Generally, the XR application 112 may provide a display output, wherein the display output may comprise a virtual environment, an augmented reality environment, or a mixed reality environment that represents a real-world environment. Additionally, the XR application 112 may receive user input 124 from the user 122 to enable the user 122 to interact with virtual objects in the extended environment via the XR capable user device 106. In some aspects, the architecture 100 may include additional XR capable user devices operated by respective additional users. The additional users may also be located in the vehicle 108, in a different vehicle, or not in a vehicle (e.g., on foot). The additional XR capable user devices may also include a locally-installed XR application 112 such that the user 122 and the additional users may share immersive experiences in the extended environment. The individual users may be provided with unique perspectives of the extended environment via respective XR capable user devices. For example, a first user may be facing eastward may view one part of an extended environment while a second user is facing westward may view another part of the same extended environment. In some examples, the user 122 may invite additional users to share the extended environment. In this regard, the user 122 may invite additional users that are listed in the user's 122 address book or contacts list. Additionally, the user 122 may invite additional users that are located within a predetermined distance of the user 122.

The OBD accessory device 110 may communicate vehicle data 120 to the XR capable user device 106. The vehicle data 120 may be made available via an application programming interface (API). However, before communicating with the XR capable user device 106, the OBD accessory device 110 must first be activated with the XR application server 114. Accordingly, the XR application 112 may include an onboarding feature for pairing the OBD accessory device 110 and the XR capable user device 106. In some aspects, the OBD accessory device 110 and the XR capable user device 106 are paired via Bluetooth Low Energy (BLE), Wi-Fi or other means over an air interface in the network 102. The XR capable user device 106 may receive a unique identifier that is associated with the OBD accessory device 110 such as an international mobile equipment identity (IMEI) number. In response to pairing with the OBD accessory device 110, the XR capable user device 106 may register the OBD accessory device 110 to the XR application server 114. In turn, the XR application server 114 may enable the OBD accessory device 110 to communicate within the network 102.

Upon receiving vehicle data 120 from the OBD accessory device 110, the XR application 112 analyzes the vehicle data 120 to perform accurate location and positioning of a user in an extended environment while the user 122 is operating the XR capable user device 110 in the vehicle 108. In one example, the XR application 112 may extract location data of the vehicle 108 from the vehicle data 120 to determine the user's 122 virtual location in an extended environment representing a real-world environment. Because the user 122 is in the vehicle 108, the location of the vehicle 108 associated with the location data corresponds to the user's real-time location in the real world and the virtual world. Accordingly, the XR application 122 may place the user in the same location within the extended environment as the user is in the real-world environment.

Similarly, the XR application 112 may extract speed data of the vehicle 108 from the vehicle data 120 to determine a user's 122 virtual speed of movement in the extended environment. Because the user 122 is in the vehicle 108, the speed of the vehicle 108 associated with the speed data corresponds with the user's 122 virtual speed of movement in the extended environment. In one example, a game user interface may provide an extended environment with one or more game components such as a race car or other virtual vehicles. In this case, the user 122 may be operating the race car in the extended environment, wherein the race car may travel at the same speed as the vehicle 108.

Additionally, the XR application 112 may extract travel direction of the vehicle 108 from the vehicle data 120 to determine a user's 122 virtual position or orientation in the extended environment. The vehicle 108 serves as a frame of reference. Accordingly, the orientation of the user 122 is relative to the vehicle 108. At the user's 122 initial position in a real-world environment, the orientation of the user 122 may correspond to the orientation of the vehicle 108. In this case, the user 122 and the vehicle 108 are facing the same direction (e.g., cardinal directions north, east, south, west) and the viewpoint of the vehicle 108 and the user 122 operating the XR capable user device 106 are the same.

Subsequently, a sensor (e.g., a motion sensor) attached to the XR capable user device 106 may sense in a real-world environment body movement of the user 122 operating the XR capable user device 106. In response, the XR application 112 may, based on the new position of the user 122 in the real-world environment with respect to the vehicle 108, adjust the orientation of the user 122 in the extended environment and display the extended environment accordingly such that the user's 122 viewpoint of the extended environment is the same as the user's 122 viewpoint of the real-world environment.

In some aspects, the system further comprises distributed computing resources 116 such as edge servers 118(1)-118(N). One or more edge servers 118(1)-118(N) may communicate with the OBD accessory device 110 and/or the XR capable user device 106. In the illustrated embodiment, the XR capable user device 106 is communicatively coupled to an edge server 118(N). The edge servers 118(1)-118(N) may include the XR application 112.

The edge servers 118(1)-118(N) may include general-purpose computers, such as desktop computers, tablet computers, laptop computers, servers (e.g., on-premise servers), or other electronic devices that are capable of receiving input, processing the input, and generating output data. The edge servers 118(1)-118(N) may store data in a distributed storage system such as the data store 126, in which data may be stored for long periods of time and replicated to guarantee reliability.

Accordingly, the edge servers 118(1)-118(N) may provide data and processing redundancy, in which data processing and data storage may be scaled in response to demand. Further, in a networked deployment, new edge servers 118(1)-118(N) may be added. Thus, the edge servers 118(1)-118(N) can include a plurality of physical machines that may be grouped and presented as a single computing system. Each physical machine of the plurality of physical machines may comprise a node in a cluster. The edge servers 118(1)-118(N) may also be in the form of virtual machines, such as virtual engines (VE) and virtual private servers (VPS).

Example XR Capable User Device Components

Figure 2:
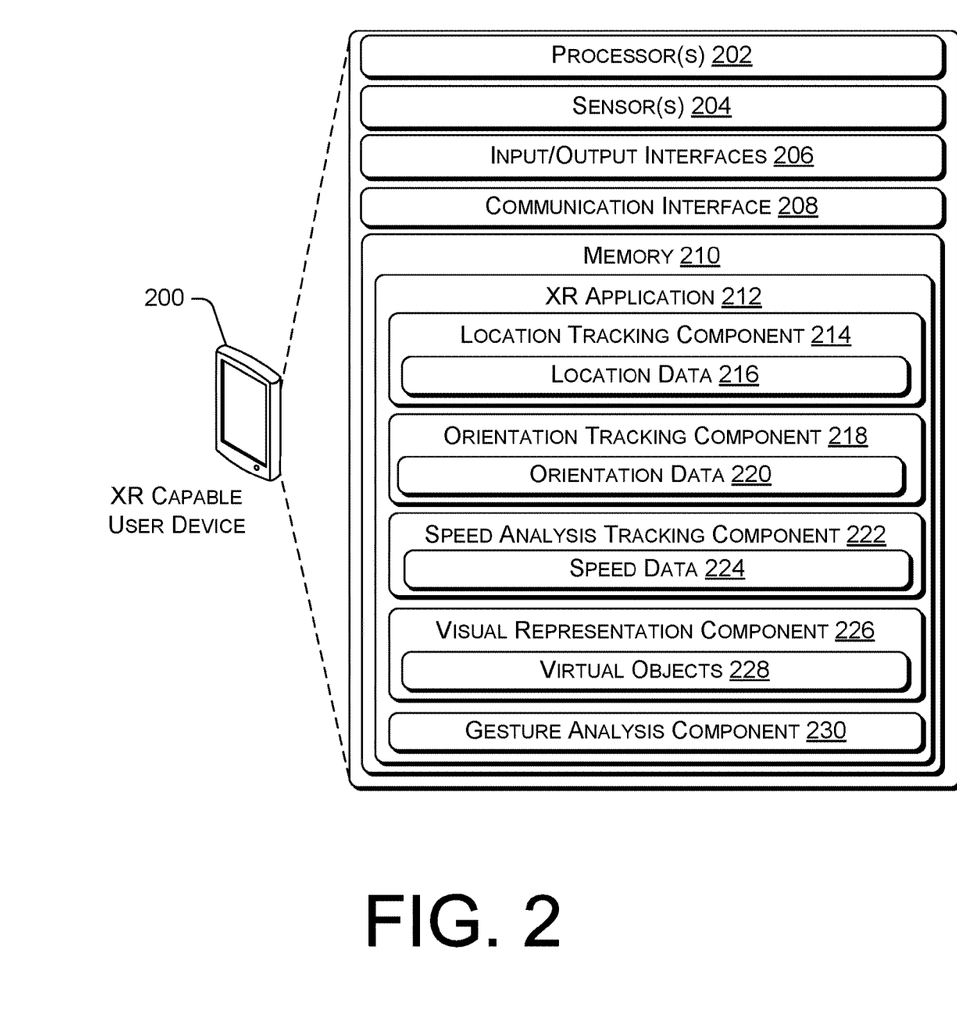
FIG. 2 is a block diagram showing various components of an XR capable user device that presents an extended environment representing a real-world environment to a user.

FIG. 2 is a block diagram showing various components of an illustrative computing device, wherein the computing device can comprise an XR capable user device 200 that presents an extended environment representing a real-world environment to a user. It is noted that the XR capable user device 200 as described herein can operate with more or fewer of the components shown herein. Additionally, the XR capable user device 200, as shown herein or portions thereof, can serve as a representation of one or more of the computing devices of the present system.

The XR capable user device 200 may include one or more processor(s) 202, sensor(s) 204, input/output interfaces 206, communication interface 208, and memory 210. In at least one example, the one or more processor(s) 202 may be a central processing unit(s) (CPU), graphics processing unit(s) (GPU), both a CPU and GPU or any other sort of processing unit(s). Each of the one or more processor(s) 204 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution. The one or more processor(s) 204 may also be responsible for executing all computer applications stored in the memory 210, which can be associated with common types of volatile (RAM) and/or nonvolatile (ROM) memory.

The XR capable user device 200 may further include one or more sensor(s) 204 for detecting environmental data associated with the client device. The one or more sensors 204 may include a light sensor, a microphone to detect ambient noise, an olfactory sensor, a moisture sensor, a temperature sensor, and/or so forth. The one or more sensor(s) 204 may also provide one or more motion and/or position determination functionalities. Such motion and/or position determination capabilities may be provided using digital cellular positioning techniques GPS, and/or Satellite Positioning System (SPS). Additionally, the sensor(s) 204 may include one or more motion sensors (e.g., simple switches, accelerometers, gyroscopes, magnetometers, angle sensors, etc.), or other onboard devices to provide relative position, velocity, acceleration, and/or orientation information of the XR capable user device 200.

The input/output interface(s) 206 may include any type of output interface known in the art, such as a display (e.g. a liquid crystal display), audio speakers, a vibrating mechanism, or a tactile feedback mechanism. Input/output interface(s) 206 also include ports for one or more peripheral devices, such as headphones, peripheral speakers, or a peripheral display. Further, the input/output interface(s) 206 may further include a camera, a microphone, a keyboard/keypad, mouse devices, a touch-sensitive display that accept gestures, voice or speech recognition devices, hand gesture recognition devices, and any other suitable devices. A keyboard/keypad may be a push-button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like. Further, the input/output interface(s) 206 may facilitate client and system interactions via an augmented reality platform, a virtual reality platform, a voice-controlled platform, or any combination thereof.

The communication interface 208 may include wireless and/or wired communication components that enable the XR capable user device to transmit data to and receive data from other networked devices. For example, the communication interface 208 may include any sort of transceiver known in the art such as a radio transceiver that performs the function of transmitting and receiving radio frequency communications via an antenna. In addition, the communication interface 208 may also include a wireless communication transceiver and a near-field antenna for communicating over unlicensed wireless Internet Protocol (IP) networks, such as local wireless data networks and personal area networks (e.g. Bluetooth or near field communication (NFC) networks). Further, the communication interface 208 may include wired communication components, such as an Ethernet port or a Universal Serial Bus (USB).

The memory 210 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The processor(s) 204 and the memory 210 of the XR capable user device 200 may implement an XR application 212. The XR application 212 may include routines, program instructions, objects, and/or data structures that perform particular tasks or implement particular abstract data types. For example, the XR application 212 may include one or more instructions, which when executed by the one or more processor(s) 204, direct the XR capable user device 200 to perform operations related to receiving, processing, and presenting an extended environment using vehicle data collected from the OBD accessory device.

The XR application 212 may comprise a location tracking component 214, an orientation tracking component 218, speed analysis tracking component 222, visual representation component 226, and gesture analysis component 230. The location tracking component 214 may include one or more instructions, which when executed by the one or more processor(s) 204, direct the XR capable user device 200 to perform operations related to receiving and processing location data 216 of a vehicle from an OBD accessory device that is paired to the XR capable user device 200. The location data 216 corresponds with the location data of the XR capable user device 200, and thereby a user operating the XR capable user device 200. The location tracking component 214 determines the location of the user within an extended environment based at least on the location data 216 of the vehicle. In some aspects, the location tracking component 214 may periodically calibrate the XR capable user device 200 to align an extended environment with a real-world environment with respect to a current location of a vehicle.

Upon determining the virtual location of the user within an extended environment, the location tracking component 214 may place the user in the same location within the extended environment as the user is in the real-world environment. The location tracking component 214 may store the location data 216 in the memory 210 and/or one or more databases (e.g., the data store of FIG. 1). In some aspects, access to the location data 216 stored in the databases may be subject to access controls consistent with current privacy laws.

The speed analysis tracking component 222 may include one or more instructions, which when executed by the one or more processor(s) 204, direct the XR capable user device 200 to perform operations related to receiving and processing speed data 224 of a vehicle from an OBD accessory device that is paired to the XR capable user device 200. The speed data 224 corresponds with the speed data of the XR capable user device 200, and thereby a user operating the XR capable user device 200. The speed analysis tracking component 222 determines the virtual speed of movement of the user within an extended environment based at least on the speed data 224 of the vehicle. The speed analysis tracking component 222 may adjust the frame rate of the XR capable user device 200 based at least on the speed data 224.

In one aspect, the extended environment may be provided by a game user interface. The extended environment may include one or more virtual objects 228 comprising one or more game components. In a racing game, for example, a game component may be a race car. In this case, the speed analysis tracking component 222 may control the speed of the race car such that the race car may appear to travel at the same speed as the real vehicle.

The orientation tracking component 218 may include one or more instructions, which when executed by the one or more processor(s) 204, direct the XR capable user device 200 to perform operations related to receiving and processing orientation data 220 of a vehicle from an OBD accessory device that is paired to the XR capable user device 200. The orientation data 220 may include a travel direction of a vehicle. The orientation tracking component 218 determines a user's virtual position or orientation in the extended environment by using a vehicle as a frame of reference. Accordingly, the orientation of the user is relative to the vehicle.

At the user's initial position in a real-world environment, the orientation of the user corresponds to the orientation of the vehicle such that the user and the vehicle are facing the same direction and the viewpoint of the vehicle and the XR capable user device are the same. In some aspects, the orientation tracking component 218 may calibrate the XR capable user device 200 to align an extended environment with a real-world environment with respect to a current orientation of a vehicle.

Subsequently, one or more sensor(s) 204 (e.g., a motion sensor) may sense in a real-world environment body movement of the user operating the XR capable user device 200. In response to receiving motion detection from the sensor(s) 204, the orientation tracking component 218 may, based on the new position of the user in the real-world environment with respect to the vehicle, adjust the virtual position or orientation of the user in the extended environment. In this way, the orientation tracking component 218 may display the extended environment to the user in the same way that the user would see the real-world environment.

The visual representation component 226 may be configured to provide a 3D representation of a user's real-world environment. The visual representation component 226 may also combine virtual objects 228 with a 3D presentation of real-world objects. The virtual objects 228 may include images, texts, symbols, annotations, markers, and/or so forth. For example, the visual representation component 226 may provide a holographic overlay of annotations over a landmark within a real-world environment. In another example, the visual representation component 226 may highlight directions or destinations. In some aspects, the visual representation component 226 may control the brightness, sharpness, color, saturation, and/or other display settings for adjusting image quality. The visual representation component 226 may adjust the display settings based on ambient light data measured via one or more sensor(s) 204 or based at least on user input.

The visual representation component 226 may also control the appearance criteria of the virtual objects 228 and the 3D representation of a real-world environment and the virtual objects 228 within an extended environment. For example, the appearance criteria may define conditions to trigger the presentation of a virtual object in an extended environment. In cases where multiple virtual objects 228 are presented, the appearance criteria may define the order in which the individual virtual objects 228 are presented.

The gesture analysis component 230 may capture and quantify a gesture performed by a user via the XR capable user device 200. The gesture analysis component 230 may monitor a user's interaction within an extended environment. In some examples, the gesture analysis component 230 may associate a captured gesture with one or more functions of a virtual object. The one or more functions may include displaying one or more virtual objects, interacting with one or more virtual objects, triggering events, and/or so forth. In some embodiments, the gesture analysis component 230 may employ one or more trained machine learning algorithms to analyze the user's actions and further determine whether those actions are consistent instructions annotated or recorded within a corresponding virtual object.

In some aspects, the XR application 212 may create one or more user profiles. The individual user profiles may be associated with a user and the XR application 212 may include a user interface for allowing the user to login using one or more credentials (e.g., username and password). The individual user profiles may be associated with one or more virtual objects 228, functions, settings, and/or other customizations. For example, the virtual objects 228 may be unique to a single user such that the virtual object 228 is displayed only to a user associated with specified credentials. In another example, one or more functions associated with the virtual objects 228 may be unique to a single user and the functions are performed only when a user associated with specified credentials activate the functions. In this way, only certain users associated with specified credentials may be authorized to interact with the virtual objects 228.

In some aspects, an authorized user may share the virtual objects 228 with an additional user by granting permission or invite a new user to share the virtual objects 228 in the extended environment. For example, the authorized user may associate the virtual objects 228 with the credentials of the additional user or the new user. In other examples, the authorized user may send an invitation (e.g., via an electronic mail, text, SMS, in-application messaging, etc.) to the additional user or the new user. The invitation may include a link that may be associated with the virtual objects 228. The additional user or the new user may access the link in order to verify the additional user's credentials or the new user's credentials. Upon verifying the additional user's credentials or the new user's credentials, the additional or new user may interact with the virtual objects 228.

In some aspects, a user may simply share an extended environment with an additional user or invite an additional user to the extended environment without granting permission to the additional user to interact with one or more virtual objects 228 in the extended environment. The additional user may operate an additional XR capable user device that includes the XR application locally installed thereon. In one example, the user may send an invitation (e.g., via an email, text, SMS, in-application messaging, etc.) to the additional user, wherein the invitation includes a link that is associated with the extended environment. The additional user may access the link in order to verify his or her credentials. Upon verifying the additional user's credentials, the additional user may interact with the user in the extended environment. For example, the additional user may play a game with the user. In another example, the additional user may manipulate a virtual object to interact with the user.

Example Computing Device Components

Figure 3:
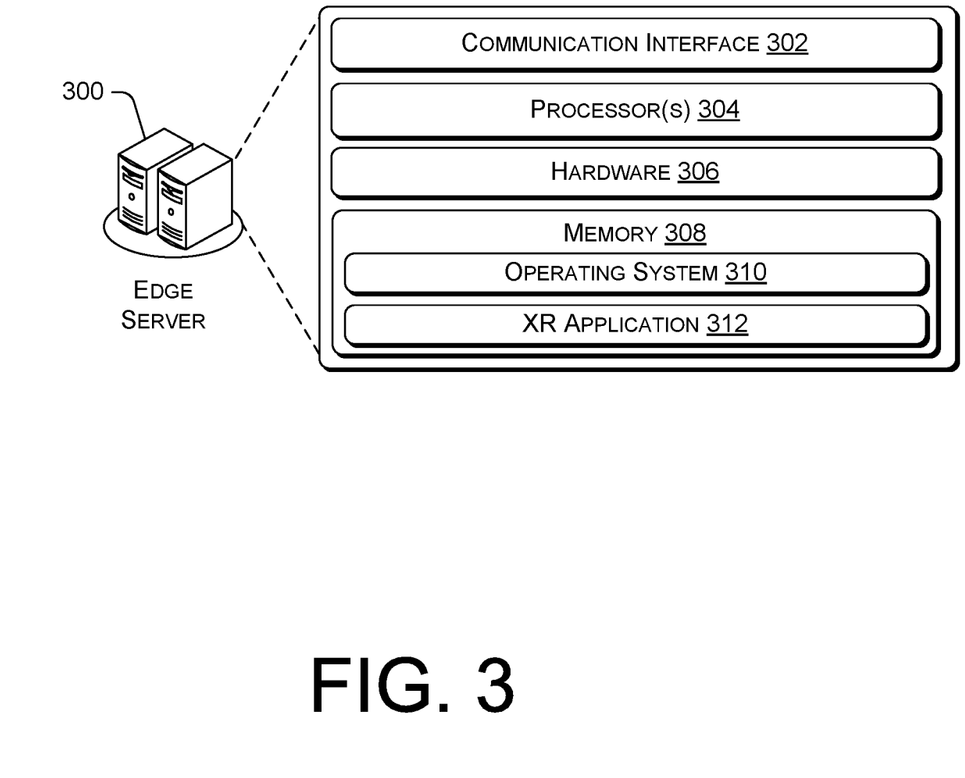
FIG. 3 is a block diagram showing various components of an illustrative computing device that processes real-world environment data for presentation of an extended environment via an XR capable user device.

FIG. 3 is a block diagram showing various components of an illustrative computing device, wherein the computing device can comprise an edge server 300. It is noted that the edge server 300 as described herein can operate with more or fewer of the components shown herein. Additionally, the edge server 300 as shown herein or portions thereof can serve as a representation of one or more of the computing devices of the present system.

The edge server 300 may include a communication interface 302, one or more processors 304, hardware 306, and memory 308. The communication interface 302 may include wireless and/or wired communication components that enable the edge server 300 to transmit data to and receive data from other networked devices. In at least one example, the one or more processor(s) 304 may be a central processing unit(s) (CPU), graphics processing unit(s) (GPU), both a CPU and GPU or any other sort of processing unit(s). Each of the one or more processor(s) 304 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution.

The one or more processor(s) 304 may also be responsible for executing all computer applications stored in the memory, which can be associated with common types of volatile (RAM) and/or nonvolatile (ROM) memory. The hardware 306 may include additional user interface, data communication, or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices.

The memory 308 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 308 may also include a firewall. In some embodiments, the firewall may be implemented as hardware 306 in the XR capable user device.

The processors 304 and the memory 308 of the edge server 300 may implement an operating system 310 and an XR application 312. The XR application 312 may include routines, program instructions, objects, and/or data structures that perform particular tasks or implement particular abstract data types. The XR application 312 may correspond to the XR application 212 of FIG. 2. Accordingly, the XR application 212 may include one or more instructions, which when executed by the one or more processor(s) 304, direct the edge server 300 to perform operations related to receiving, processing, and presenting an extended environment using vehicle data collected from the OBD accessory device.

The operating system 310 may include components that enable the edge server 300 to receive and transmit data via various interfaces (e.g., user controls, communication interface, and/or memory input/output devices), as well as process data using the processor(s) 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system.

Example Processes

Figure 4:
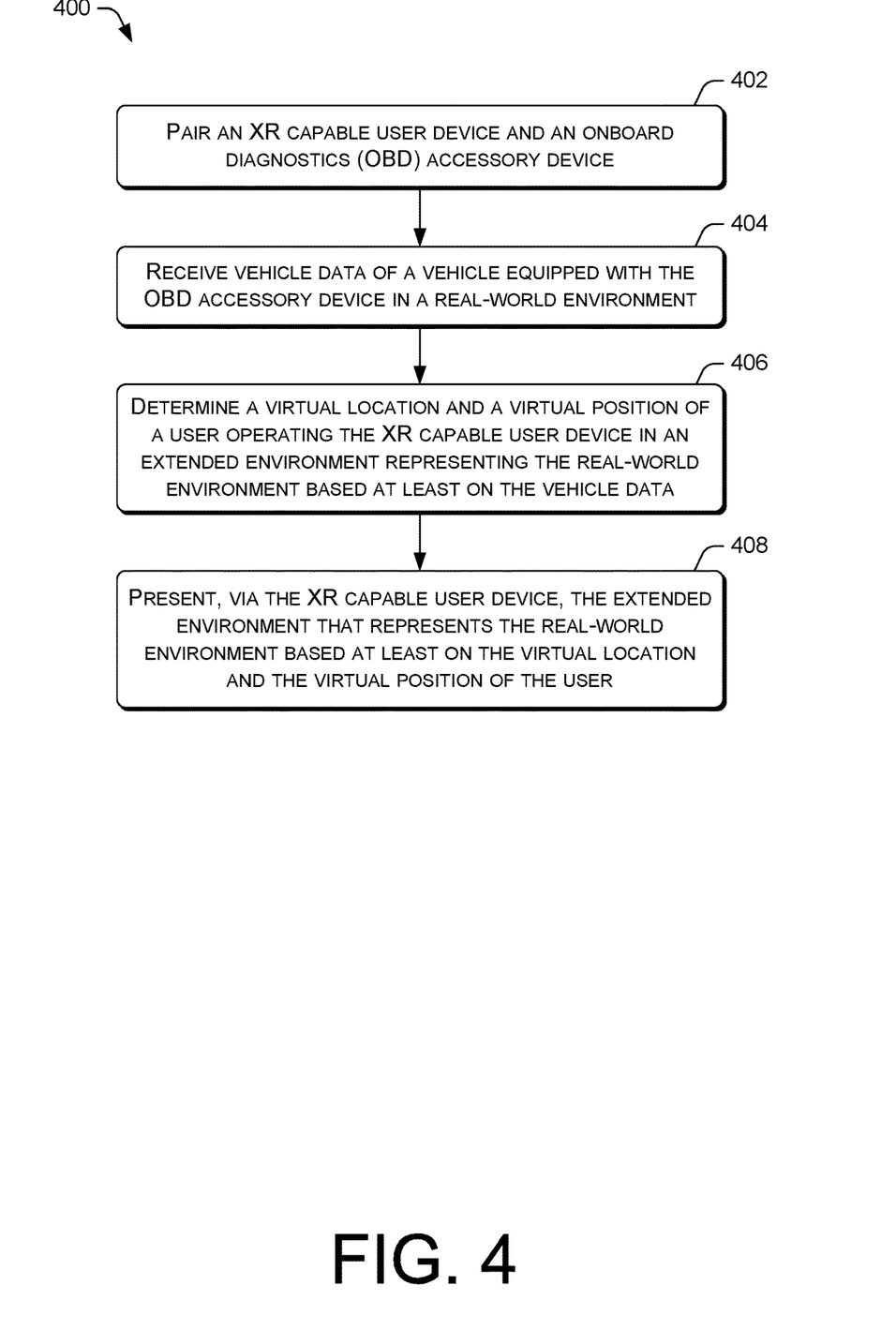
FIG. 4 is a flow diagram of an example process for translating real data for virtual systematization.
Figure 5:
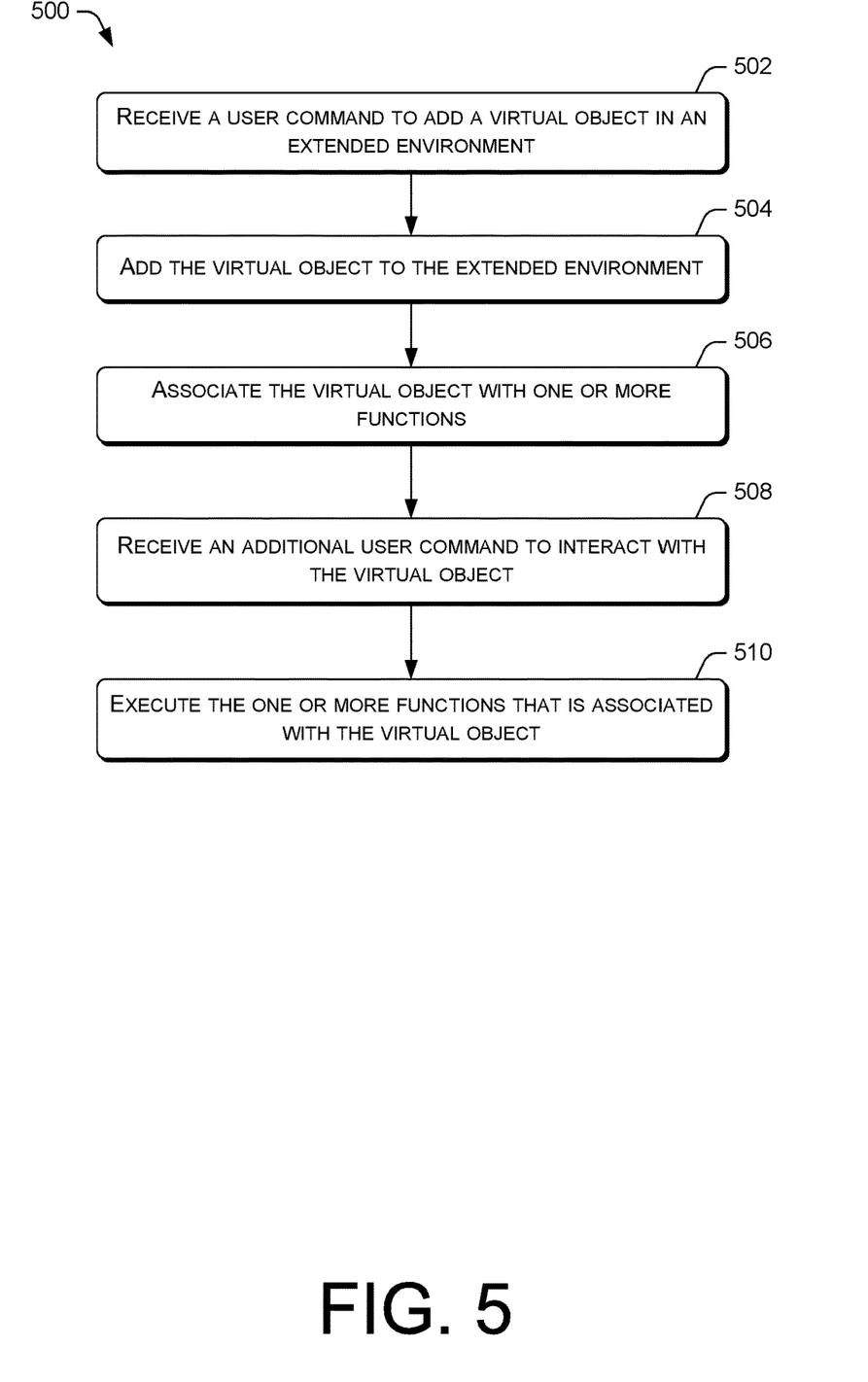
FIG. 5 is a flow diagram of an example process for placing virtual objects in an extended environment.

FIGS. 4 and 5 present illustrative processes 400-500 for presenting an extended environment based on real data obtained from a real-world environment. The processes 400-500 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process 300 is described with reference to FIGS. 1-3.

FIG. 4 is a flow diagram of an example process 400 for translating real data for virtual systematization. At block 402, an XR capable user device and an onboard diagnostics (OBD) accessory device are paired. The XR capable user device includes an XR application. The onboard diagnostics (OBD) accessory device is installed in a vehicle and may be communicatively coupled to the vehicle's native OBD device, which may communicate with one or more sensors in the vehicle. The XR capable user device is operated by a user in the vehicle in which the OBD accessory device is installed. The OBD accessory device may be associated with a unique device identifier. To pair the XR capable user device and the OBD accessory device, the device identifier may be transmitted to the XR capable user device, which in turn may transmit it to an XR application server to activate the OBD accessory device.

At block 404, the XR application of the XR capable user device receives vehicle data of a vehicle equipped with the onboard diagnostics (OBD) accessory device. The vehicle data comprises orientation data, speed data, location data, and/or other such data of the vehicle in a real-world environment. The vehicle data is collected from one or more sensors of the vehicle that may be communicatively coupled to the OBD accessory device.

At block 406, the XR application determines a virtual location and a virtual position of a user operating the XR capable user device in an extended environment representing the real-world environment based at least on the vehicle data. The virtual location may correspond to the location data of the vehicle. The virtual position may be relative to the orientation data of the vehicle. At block 408, the XR application presents the extended environment that represents the real-world environment based at least on the user's virtual location and virtual position.

FIG. 5 is a flow diagram of an example process 500 for placing virtual objects in an extended environment via an XR capable user device, wherein the XR capable user device includes an XR application. The XR application may monitor a user's interaction within the extended environment. At block 502, an XR application may receive a user input to add a virtual object in an extended environment. The virtual object can comprise images, texts, symbols, annotations, markers, and/or so forth. For example, the virtual object can be a game component or an educational component.

At block 504, the XR application may add the virtual object to the extended environment. The virtual object may be authored by a user using one or more authoring tools of the XR application. In some aspects, the virtual object may be stored and later retrieved from a template, which may be stored in a data base or a data repository. Additionally, the virtual object may be shared with one or more users and the one or more users may collaborate to create the virtual object. In this regard, one user may invite additional users to access the extended environment. The virtual object may also be static or interactive. In the latter case, the virtual object may contain links or be associated with one or more functions, as indicated in block 506. For example, the functions can include triggering additional functions or events, presenting visuals, playing sounds, providing haptic signals, interacting with one or more virtual objects, or any combination thereof.

At block 508, the XR application receives an additional user input to interact with the virtual object. In some embodiments, the XR application may determine whether the additional user input is associated with an authorization to interact with the virtual object. For example, the XR application may determine whether the user providing the user input is associated with a user profile having permission to interact with the virtual object. In some aspects, the user may receive permission (e.g., via an invitation) from an additional user. Upon determining that the additional user input is associated with an authorization, the XR application executes the one or more functions that are associated with the virtual object as indicated in block 510.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
    pairing an extended reality (XR) capable user device and an onboard diagnostics (OBD) accessory device;
    receiving vehicle data of a vehicle equipped with the OBD accessory device in a real-world environment;
    determining a virtual location and a virtual position of a user operating the XR capable user device in an extended environment representing the real-world environment based at least on the vehicle data;
    presenting, via the XR capable user device, the extended environment that represents the real-world environment based at least on the virtual location and the virtual position of the user;
    receiving a first user input to add a virtual object into the extended environment;
    adding the virtual object to the extended environment at the virtual location and the virtual position;
    receiving a second user input to invite a second user operating a second XR capable user device to access the extended environment; and
    providing the second XR capable user device with access to the virtual object within the extended environment.

2. The one or more non-transitory computer-readable media of claim 1, wherein the acts further comprise:
    receiving an additional user input to interact with the virtual object; and
    executing a function that is associated with the virtual object.

3. The one or more non-transitory computer-readable media of claim 2, wherein the acts further comprise:
    determining if the user input is associated with an authorization to interact with the virtual object; and
    if the user input is associated with the authorization, performing an authorized operation associated with the function.

4. The one or more non-transitory computer-readable media of claim 1, wherein the vehicle data comprises location data and orientation data of the vehicle, and wherein the vehicle data is collected from one or more sensors of the vehicle communicatively coupled to the OBD accessory device.

5. The one or more non-transitory computer-readable media of claim 4, wherein the one or more sensors comprises a Global Positioning System (GPS) and the OBD accessory device receives GPS coordinates from the GPS, and wherein the location data is determined by the GPS coordinates.

6. The one or more non-transitory computer-readable media of claim 4, wherein the one or more sensors comprise a camera and the OBD accessory device receives images captured by the camera, and wherein the location data and the orientation data are determined by the individual images.

7. A computer-implemented method, comprising:
    pairing an XR capable user device and an onboard diagnostics (OBD) accessory device;
    receiving vehicle data of a vehicle equipped with the OBD accessory device in a real-world environment;
    determining a virtual location and a virtual position of a user operating the XR capable user device in an extended environment representing the real-world environment based at least on the vehicle data;
    presenting, via the XR capable user device, the extended environment that represents the real-world environment based at least on the virtual location and the virtual position of the user
    receiving a first user input to add a virtual object into the extended environment;
    addinq the virtual object to the extended environment at the virtual location and the virtual position;
    receivinq a second user input to invite a second user operating a second XR capable user device to access the extended environment; and
    providinq the second XR capable user device with access to the virtual object within the extended environment.

8. The computer-implemented method of claim 7, wherein the XR capable user device comprises a game user interface, the game user interface displaying the extended environment.

9. The computer-implemented method of claim 7, further comprising:
    receiving a user input to remove a second virtual object from the extended environment; and removing the second virtual object from the extended environment.

10. The computer-implemented method of claim 7, further comprising:
associating the virtual object with one or more functions;
receiving an additional user input to interact with the virtual object; and
executing the one or more functions that are associated with the virtual object.

11. The computer-implemented method of claim 7, wherein the extended environment comprises an augmented environment or a virtual environment.

12. A system, comprising:
one or more non-transitory storage mediums configured to provide stored computer-readable instructions, the one or more non-transitory storage mediums coupled to one or more processors, the one or more processors configured to execute the computer-readable instructions to cause the one or more processors to:
pair an XR capable user device and an onboard diagnostics (OBD) accessory device;
receive vehicle data of a vehicle equipped with the OBD accessory device in a real-world environment;
determine a virtual location and a virtual position of a user operating the XR capable user device in an extended environment representing the real-world environment based at least on the vehicle data;
present, via the XR capable user device, the extended environment that represents the real-world environment based at least on the virtual location and the virtual position of the user
receive a first user input to add a virtual object into the extended environment;
add the virtual object to the extended environment at the virtual location and the virtual position;
receive a second user input to invite a second user operating a second XR capable user device to access the extended environment; and
provide the second XR capable user device with access to the virtual object within the extended environment.

13. The system of claim 12, wherein the one or more processor is further configured to:
receive an additional user input to interact with the virtual object; and
execute a function that is associated with the virtual object.

14. The system of claim 13, wherein the one or more processor is further configured to:
determine if the additional user input is associated with an authorization to interact with the virtual object; and
if the additional user input is associated with the authorization, perform an authorized operation associated with the function.

15. The system of claim 12, wherein the XR capable user device comprises a game user interface, the game user interface displaying the extended environment, and wherein the extended environment comprises an augmented environment.

16. The one or more non-transitory computer-readable media of claim 1, wherein the virtual object comprises one or more of images, texts, symbols, annotations, or markers.

* * * * *